United States Patent
Ohkura et al.

(10) Patent No.: US 9,013,105 B2
(45) Date of Patent: Apr. 21, 2015

(54) HEADLAMP LIGHT SOURCE LIGHTING DEVICE AND VEHICLE HEADLAMP LIGHTING SYSTEM

(75) Inventors: Susumu Ohkura, Tokyo (JP); Takashi Ohsawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 348 days.

(21) Appl. No.: 13/378,871

(22) PCT Filed: Sep. 10, 2009

(86) PCT No.: PCT/JP2009/004498
§ 371 (c)(1),
(2), (4) Date: Dec. 16, 2011

(87) PCT Pub. No.: WO2011/030382
PCT Pub. Date: Mar. 17, 2011

(65) Prior Publication Data
US 2012/0086337 A1  Apr. 12, 2012

(51) Int. Cl.
*B60Q 1/02* (2006.01)
*B60Q 11/00* (2006.01)
*H05B 33/08* (2006.01)

(52) U.S. Cl.
CPC .......... *B60Q 11/005* (2013.01); *H05B 33/0884* (2013.01)

(58) Field of Classification Search
CPC ........... H05B 33/0893; H05B 33/0842; H05B 33/0803; H05B 33/0806; H05B 33/0884; H05B 37/0254; B60Q 11/005; B60Q 3/0293

USPC .......... 315/76, 77, 80, 82, 83, 291, 294, 307, 315/312; 362/257, 460, 465
See application file for complete search history.

(56) References Cited

U.S. PATENT DOCUMENTS

| | | | | |
|---|---|---|---|---|
| 5,216,328 A * | 6/1993 | Lu | | 315/88 |
| 5,680,098 A * | 10/1997 | Bejster et al. | | 340/458 |
| 6,281,631 B1 * | 8/2001 | Schaffer et al. | | 315/82 |
| 7,535,181 B2 * | 5/2009 | Nicolai et al. | | 315/82 |
| 8,575,839 B2 * | 11/2013 | Inoue et al. | | 315/82 |
| 8,786,191 B2 * | 7/2014 | Kuang et al. | | 315/77 |
| 2003/0226954 A1 | 12/2003 | Ohmi | | |
| 2004/0213015 A1 | 10/2004 | Ito et al. | | |
| 2006/0055244 A1 * | 3/2006 | Ito et al. | | 307/10.8 |
| 2007/0268159 A1 | 11/2007 | Futamura | | |
| 2008/0259625 A1 | 10/2008 | Noyori et al. | | |
| 2009/0200963 A1 | 8/2009 | Kitagawa et al. | | |

FOREIGN PATENT DOCUMENTS

| | | | |
|---|---|---|---|
| JP | 6-283278 A | 10/1994 | |
| JP | 2001-138799 A | 5/2001 | |
| JP | 2004-009826 A | 1/2004 | |
| JP | 2004-322982 A | 11/2004 | |

(Continued)

*Primary Examiner* — Haiss Philogene
(74) *Attorney, Agent, or Firm* — Birch, Stewart, Kolasch & Birch, LLP

(57) ABSTRACT

Right and left lighting devices 3-1 and 3-2 each include an abnormal event informing signal output circuit for outputting an abnormal event informing signal in response to an informing output of the control circuits 6-1 and 6-2. Each abnormal event informing signal output circuit has a circuit configuration that enables the abnormal event informing signal to be supplied to onboard equipment via a signal path common to the two devices.

19 Claims, 10 Drawing Sheets

(56) References Cited

FOREIGN PATENT DOCUMENTS

| | | | |
|---|---|---|---|
| JP | 2005-168650 A | 6/2005 |
| JP | 1744789 A | 3/2006 |
| JP | 2007-194086 A | 8/2007 |
| JP | 2007-308012 A | 11/2007 |
| JP | 101290097 A | 10/2008 |
| JP | 2009-006981 A | 1/2009 |
| JP | 2009-094872 A | 4/2009 |
| JP | 101505570 A | 8/2009 |

* cited by examiner

HEADLAMP LIGHT SOURCE LIGHTING DEVICE AND VEHICLE HEADLAMP LIGHTING SYSTEM

TECHNICAL FIELD

The present invention relates to a headlamp light source lighting device for lighting a headlamp employing as its light source an onboard discharge lamp or a semiconductor light source such as LEDs (Light Emitting Diodes), and to a vehicle headlamp lighting system using the same.

BACKGROUND ART

As onboard headlamps, instead of conventional halogen lamps, long-life, bright discharge lamps or light sources using LEDs come into wide use. At the same time, high-performance headlamps become widely available which have additional functions such as an AFS (Advance Front lighting System) or DRL (Daytime Running Light). Some of the high-performance headlamps have a function of informing a driver of an abnormal event of a headlamp. As a means for informing a driver of an abnormal event occurring in the vehicle, there is a warning light (alarm lamp) indicating an abnormal event visually or a warning sound (alarm buzzer) indicating an abnormal event aurally.

Patent Document 1, which relates to a system for informing a user of various abnormal events occurring in headlamps of a vehicle, discloses an abnormal event informing device for estimating and displaying the site of a malfunction including identification of a right or left light (headlamp).

Patent Document 2 discloses an onboard headlamp using a discharge lamp as its light source, which has an auxiliary light source provided separately from the discharge lamp, and lights it when an abnormal event occurs in the discharge lamp, thereby substituting it for the discharge lamp having a fault owing to the occurrence of the abnormal event.

Patent Document 3 discloses a light source lighting device with a communication function. The light source lighting device enables quick communication processing while executing the lighting processing appropriately even if the communication processing is performed during the processing of lighting the discharge lamp.

Conventionally, although apparatuses have been disclosed which integrate the lighting devices for lighting right and left headlamps of a vehicle as in the Patent Documents 1 and 2, there is none that arranges abnormal event informing paths, which are provided for informing an abnormal event occurring in the right and left independent headlamps, into a single path.

For example, in the Patent Document 1, a plurality of LEDs for informing a driver of an occurrence of a fault or an estimate result of a fault are provided corresponding to the right and left discharge lamps of the headlamps of a vehicle, so that an abnormal event occurring in a headlamp is indicated by lighting the corresponding LED. In the Patent Document 2, although it outputs a switching signal for lighting the auxiliary light source, it does not arrange the informing system of an abnormal event for the driver into a single system.

In addition, although the Patent Document 3 discloses communication processing with external equipment via a communication control unit provided in the lighting device, it does not describe a signal format for notifying an abnormal event informing device mounted in the vehicle of an abnormal event occurring in one of the right and left headlamp lighting devices of the vehicle in cooperation with the communication operation of the other lighting device.

As described above, although systems for informing of an abnormal event in detail in various ways are disclosed, when an abnormal event occurs in a headlamp of a vehicle, it will not matter much to a driver whether the abnormal event occurs in the right or left headlamp, but it will be enough for the driver to be able to identify that a headlamp has an abnormal event in the first place. To achieve this, as for informing a driver of a headlamp abnormal event, a single system that integrates right and left is enough, and hence it is necessary to reduce excessive functions of the conventional examples and to reduce the components involved with the reduction.

The present invention is implemented to solve the foregoing problems. Therefore it is an object of the present invention to provide a headlamp light source lighting device and a vehicle headlamp lighting system using the same capable of simplifying a configuration of an output system and reducing the amount of components necessary for the configuration by arranging the output system, which transfers information about an abnormal event detected with right and left headlamp light source lighting devices to an abnormal event informing device, into a single system, thereby being able to contribute to the reduction in the weight of the vehicle as a result.

PRIOR ART DOCUMENT

Patent Document

Patent Document 1: Japanese Patent Laid-Open No. 6-283278/1994.

Patent Document 2: Japanese Patent Laid-Open No. 2001-138799.

Patent Document 3: Japanese Patent Laid-Open No. 2007-194086.

DISCLOSURE OF THE INVENTION

A headlamp light source lighting device in accordance with the present invention has a control unit for performing lighting control of a light source, for detecting an abnormal event occurring at least in the light source and for producing an informing output indicating the presence or absence of the abnormal event, wherein an abnormal event informing signal output circuit each of the right and left headlamp light source lighting devices includes supplies its abnormal event informing signal to onboard equipment via a signal path common to the two devices.

According to the present invention, since the right and left headlamp light source lighting devices each include the abnormal event informing signal output circuit which outputs the abnormal event informing signal in response to the informing output of the control unit, and the abnormal event informing signal each abnormal event informing signal output circuit outputs is supplied to the onboard equipment via the signal path common to the two devices, the outputs of the abnormal event informing signals of the right and left headlamp light source lighting devices are integrated into a single system. Accordingly, it offers an advantage of being able to simplify a wire harness for transferring the informing signals and the input circuit of the informing signals on the onboard equipment side, and to reduce the amount of components used for the configuration. In addition, reduction in the number of parts can be expected, which contributes to the weight reduction of the vehicle.

EMBODIMENTS FOR CARRYING OUT THE INVENTION

The best mode for carrying out the invention will now be described with reference to the accompanying drawings to explain the present invention in more detail.

Embodiment 1

Figure 1:
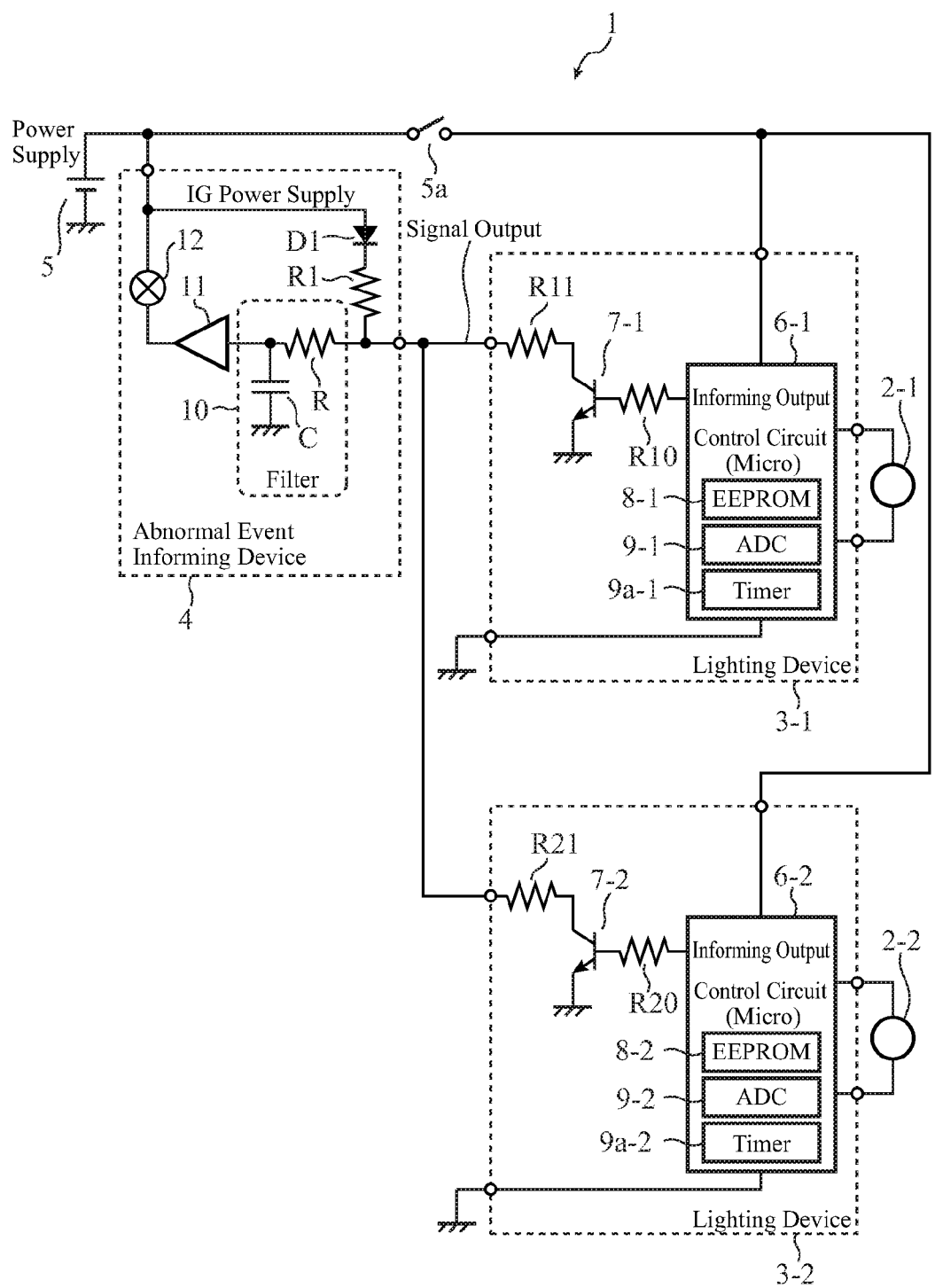
FIG. 1 is a diagram showing a configuration of a vehicle headlamp lighting system using a headlamp light source lighting device of an embodiment 1 in accordance with the present invention.

FIG. 1 is a diagram showing a configuration of a vehicle headlamp lighting system using a headlamp light source lighting device of an embodiment 1 in accordance with the present invention. In FIG. 1, the vehicle headlamp lighting system 1 of the embodiment 1 comprises light sources 2-1 and 2-2, lighting devices (headlamp light source lighting device) 3-1 and 3-2, an abnormal event informing device 4, a power supply 5 and a power supply switch (power supply SW) 5a. The light source 2-1 (2-2), which is a light source of a vehicle right (left) headlamp, is composed of a discharge lamp such as an HID bulb or semiconductor light-emitting elements such as LEDs. The lighting device 3-1 (3-2) is a device for lighting the light source 2-1 (2-2), and comprises a control circuit (control unit) 6-1 (6-2), which includes a circuit for performing its proper light source lighting control, and a switching element 7-1 (7-2).

The control circuit 6-1 (6-2) comprises a microcomputer (micro) for controlling the operation of the lighting device 3-1 (3-2), has an abnormal event detecting function of detecting a fault of the lighting device 3-1 (3-2), or a lighting malfunction or a switch-off state of the light source 2-1 (2-2), and outputs an abnormal event informing signal (informing output) indicating the presence or absence of the occurrence of the abnormal event. The informing output from the control circuit 6-1 (6-2) is supplied to the base terminal of the switching element 7-1 (7-2) via a resistor R10 (R20).

The switching element 7-1 (7-2) is composed of an NPN transistor which has its base terminal connected to the informing output terminal of the control circuit 6-1 (6-2) via the resistor R10 (R20), and has its emitter terminal grounded and its collector terminal form an open collector output for a signal output to the abnormal event informing device 4. The control circuit 6-1, switching element 7-1 and resistors R10 and R11 constitute an abnormal event informing signal output circuit of the lighting device 3-1, and the control circuit 6-2, switching element 7-2 and resistors R20 and R21 constitute an abnormal event informing signal output circuit of the lighting device 3-2.

When the switching element 7-1 is off, since a voltage drop through the resistors R1 and R11 does not occur, the signal output of the lighting device 3-1 side is placed at a high potential level (H level) corresponding to the ignition (IG) power supply. On the other hand, when the switching element 7-1 is on, since a voltage drop occurs because of a collector current flowing through the resistors R1 and R11, the signal output of the lighting device 3-1 side is pulled down to a low potential level (L level) (active "L") corresponding to the ground level.

Likewise, when the switching element 7-2 is off, since a voltage drop through the resistors R1 and R21 does not occur, the signal output of the lighting device 3-2 side is pulled up to the H level. In addition, when the switching element 7-2 is on, since a voltage drop through the resistors R1 and R21 occurs, the signal output of the lighting device 3-2 side is pulled down to the L level (active "L").

The control circuit 6-1 (6-2) has as its hardware configuration used for the control processing an EEPROM (Electrically Erasable and Programmable Read Only Memory) 8-1 (8-2), an A/D converter 9-1 (9-2) and a timer 9a-1 (9a-2). The EEPROM 8-1 (8-2) is a storage unit for storing abnormal event information indicating occurrence of an abnormal event detected by a control circuit 6-1 (6-2). As the storage unit, a nonvolatile storage element such as an EEPROM is enough, or a nonvolatile flash memory can also be used. An A/D converter (A/D converter unit) 9-1 (9-2) carries out digital conversion of an analog signal supplied from a thermistor or the like not shown used for the proper light source lighting control. The timer 9a-1 (9a-2) is a timer for timing an arbitrary period of time.

The abnormal event informing device 4, which is a device for lighting an alarm lamp 12 in response to a result of comparing a signal output value indicating abnormal event information from the control circuit 6-1 (6-2) with a predetermined signal discrimination voltage value, comprises a filter 10 and a decision circuit 11. The filter 10 comprises a resistor R connected to the output path of the abnormal event informing signal and a capacitor C having its first end grounded, and generates a smoothed signal of the abnormal event informing signal.

The decision circuit 11 is a comparator for comparing the voltage level of the smoothed signal passing through the filter 10 with the predetermined abnormal event informing discrimination voltage for deciding the presence or absence of an abnormal event, and supplies the alarm lamp 12 with the output signal with a predetermined potential level if making a decision that the abnormal event occurs. The alarm lamp 12 is a lamp that undergoes lighting control in response to a decision result of the decision circuit 11. A driver can learn from the lighting of the alarm lamp 12 that an abnormal event occurs in the light source 2-1 (2-2) or lighting device 3-1 (3-2).

As described above, the present embodiment 1 connects in a wired OR fashion the outputs of both the switching elements 7-1 and 7-2 having the open collector output so as to be able to combine the output voltages of the abnormal event informing signals from the control circuits 6-1 and 6-2. Thus arranging the abnormal event informing output systems of the right and left lighting devices 3-1 and 3-2 of a vehicle into a single system makes it possible to simplify the configuration of the output system and to reduce the amount of components required for the configuration. In addition, the simple configuration and the reduction in the number of parts can contribute to weight reduction of the vehicle.

Next, the operation will be described.

Figure 2:
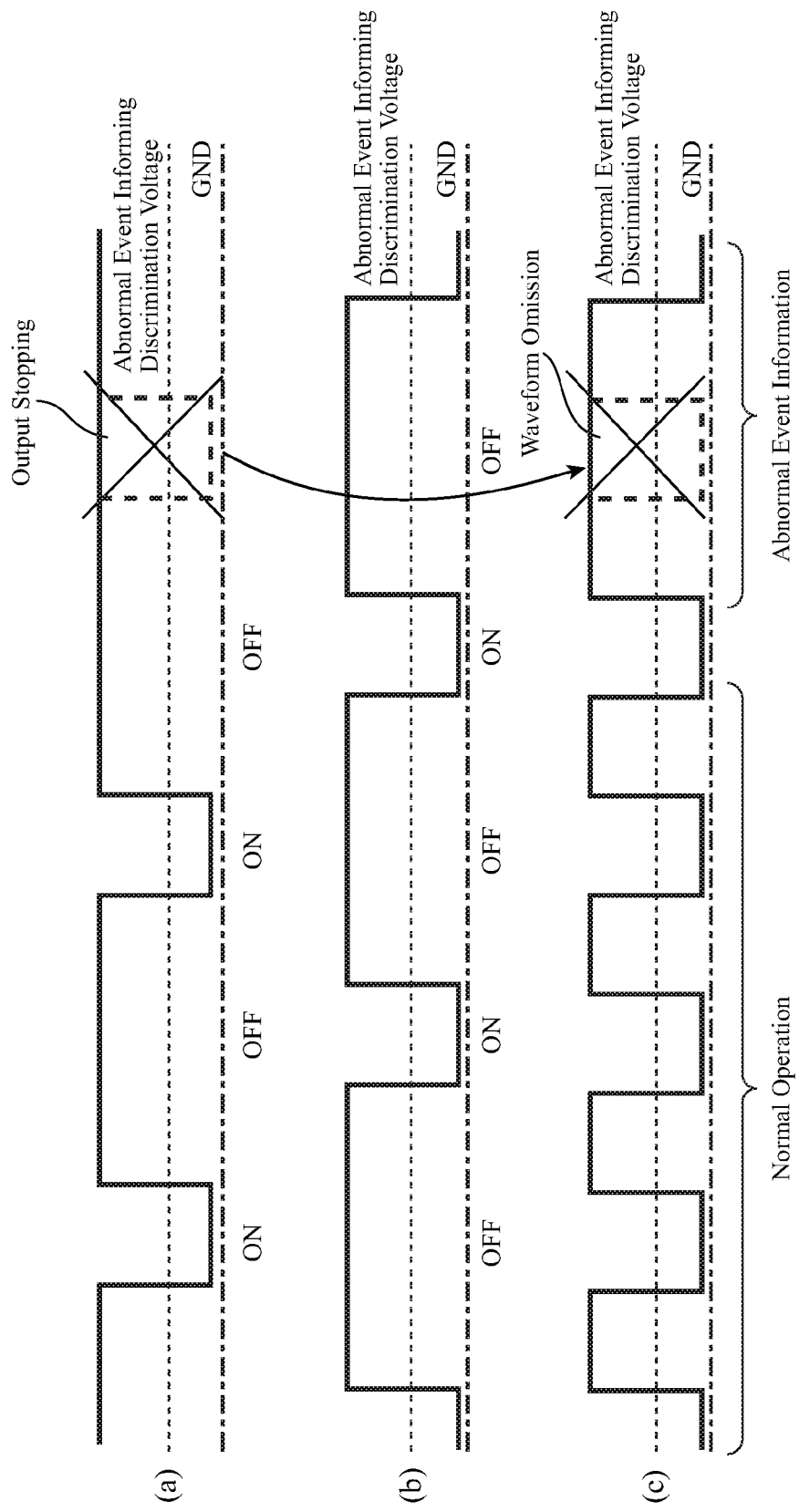
FIG. 2 is a diagram showing output waveforms of an abnormal event informing signal of the lighting device of the embodiment 1.

FIG. 2 is a diagram showing output waveforms of the abnormal event informing signal in the lighting device of the embodiment 1; FIG. 2(a) shows the output waveform of the abnormal event informing signal of the lighting device 3-1; FIG. 2(b) shows the output waveform of the abnormal event informing signal of the lighting device 3-2; and FIG. 2(c) shows a combined output waveform of the abnormal event informing signals of the lighting devices 3-1 and 3-2.

Here, as long as the control circuit 6-1 operates normally, it produces a rectangular wave with a predetermined period as the informing output, and if an abnormal event occurs in at least one of the light source 2-1 and lighting device 3-1, it stops the output of the rectangular wave. Likewise, as long as the control circuit 6-2 operates normally, it continuously outputs a rectangular wave with the predetermined period as the informing output, and if an abnormal event occurs, it stops the output of the rectangular wave. As for the output period of the rectangular wave, it can be set at about 100 Hz, for example.

The regular rectangular wave with the predetermined period is output when the micro constituting the control circuit 6-1 (6-2) operates normally. In other words, if an abnormal event occurs in the control circuit 6-1 (6-2), the output of the rectangular wave stops completely or cannot be produced at an appropriate period. Accordingly, it is possible to inform the driver of the possibility that an abnormal event occurs in the control circuit 6-1 (6-2) by using the rectangular wave as the abnormal event informing signal and by discriminating the voltage level smoothed through the filter 10 of the decision circuit 11.

The switching element 7-1 (7-2) turns on and off in response to the rectangular wave (informing output) from the control circuit 6-1 (6-2). When the switching element 7-1 is on, its signal output is placed at L level, and if it is off, the signal output is placed at H level, thereby producing the output waveform shown in FIG. 2(a).

The switching elements 7-1 and 7-2 operates alternately. The switching element 7-2 is on at the timing when the switching element 7-1 of the lighting device 3-1 side is off so that its signal output is placed at L level. Likewise, the switching element 7-1 is on at the timing when the switching element 7-2 is off so that its signal output is placed at L level. Thus, the output waveforms as shown in FIGS. 2(a) and 2(b) appear.

In addition, since the collectors of the switching elements 7-1 and 7-2 have the wired OR connection, in the normal operation shown in FIG. 2(c), the signal output waveforms from the control circuits 6-1 and 6-2 are combined to form a single rectangular wave with an approximately uniform period. In this way, if the abnormal event informing signal is a regular rectangular wave signal, the filter 10 for smoothing it to produce a DC voltage level signal to be compared with the abnormal event informing discrimination voltage for making a decision is simplified and can be constructed easily. Accordingly, the input circuit of the abnormal event informing device 4 can be configured easily.

Incidentally, a configuration is also possible in which the control circuits 6-1 and 6-2 adjust the width of the rectangular wave of the informing output in such a manner that the abnormal event informing signal output waveform, which is produced by combining the abnormal event informing signals output from the lighting devices 3-1 and 3-2, has a ratio of 1:1 in width between H level and L level, that is, has a duty ratio of about 50%. In this case, generating signals with a ratio of 3:1 in width between the H level and L level alternately by the lighting devices 3-1 and 3-2 enables the abnormal event informing signal output waveform produced by combining the two waves to form a regular rectangular wave signal with a duty ratio of about 50%. By thus doing, the configuration of the filter 10 can be simplified, and the input circuit of the abnormal event informing device 4 can be constructed more easily.

Here, if an abnormal event occurs in the light source 2-1 or lighting device 3-1, for example, the control circuit 6-1 stops the informing output. Accordingly, as indicated by the X in FIG. 2(a), the abnormal event informing signal output from the lighting device 3-1 stops and the output voltage is placed at H level as indicated by a solid line. Here, as for the abnormal event informing signal output waveform that combines the two waves from the lighting devices 3-1 and 3-2, as indicated by the X in FIG. 2(c), the output waveform of the lighting device 3-1 side has an omission as indicated by a solid line. After that, the decision circuit 11 compares the potential level of the output of the filter 10 that smoothes the abnormal event informing signal output waveform with the abnormal event informing discrimination voltage to detect the output waveform omission, thereby lighting the alarm lamp 12.

As described above, according to the present embodiment 1, the right (left) lighting device 3-1 (3-2) has the abnormal event informing signal output circuit for outputting the abnormal event informing signal in response to the informing output of the control circuit 6-1 (6-2), and each abnormal event informing signal output circuit supplies its own abnormal event informing signal to the onboard equipment via the common signal path. With this configuration, it can integrate the output system for transferring the information about the abnormal event occurring in the right (left) headlamp light source 2-1 (2-2) or in the lighting device 3-1 (3-2) for lighting it to the abnormal event informing device 4 into the single system. Thus, it can simplify the configuration of the output system and reduce the amount of components necessary for the configuration, and can contribute to the weight reduction of the vehicle as well.

Incidentally, although the foregoing embodiment 1 shows the abnormal event informing signal output circuits which employ the NPN transistors as the switching elements 7-1 and 7-2, and arrange them in the open collector circuits connected in the wired OR fashion, the present invention is not limited to the configuration.

For example, as a configuration that outputs a rectangular wave as the informing output and has an active "L" structure for outputting an L level signal in the on state, a configuration is also possible which employs an open drain using a field-effect transistor (FET) for the switching element 7-1 (7-2).

In addition, a totem-pole output stage which arranges transistors top and bottom can be used.

Furthermore, it is also possible to construct the abnormal event informing signal output circuit by one of the open collector output, open drain output and totem pole output, and to inform of the abnormal event by a voltage signal instead of the rectangular wave through the resistors R11 and R21 connected in series to the signal output.

Embodiment 2

Figure 3:
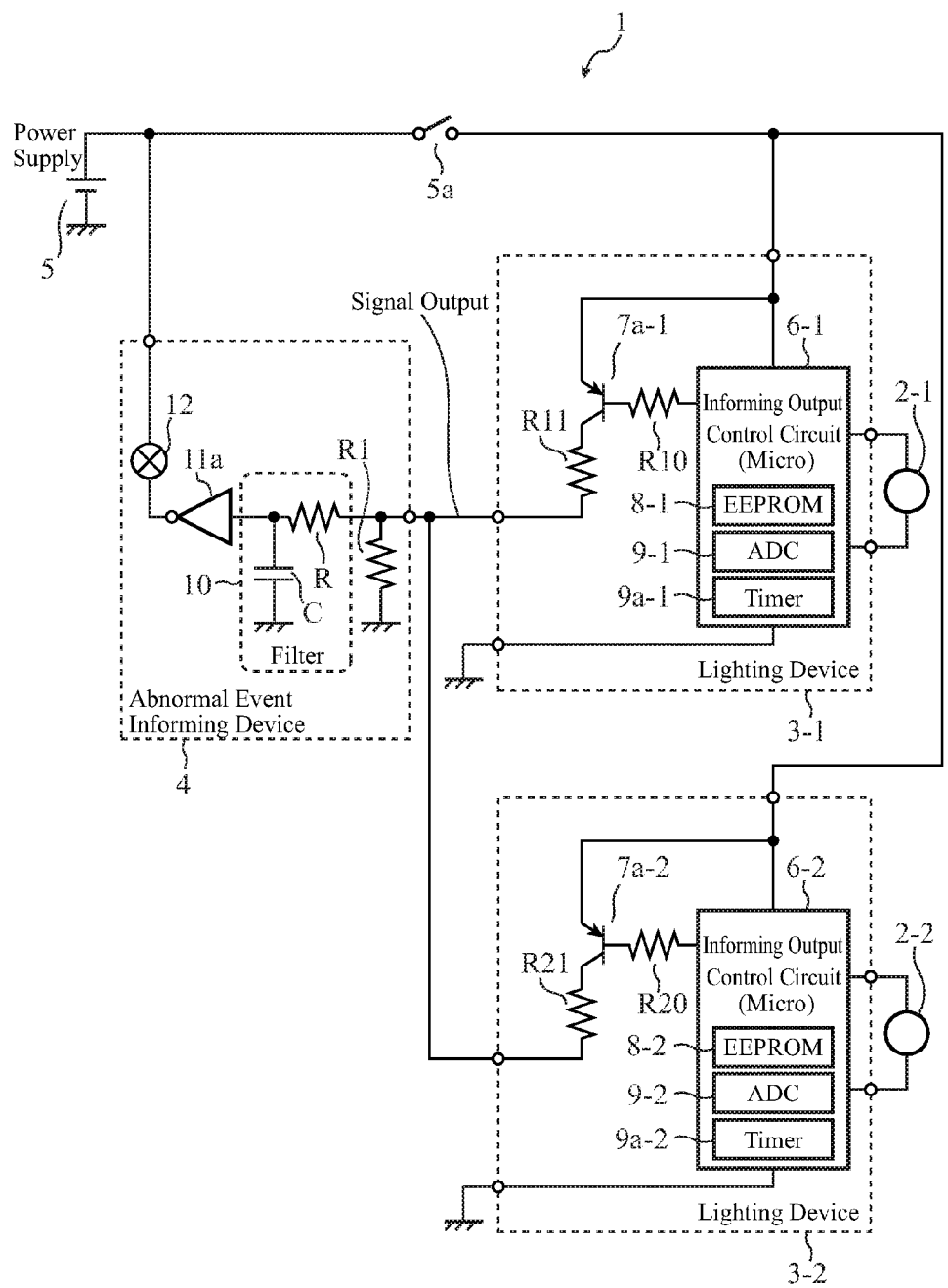
FIG. 3 is a diagram showing a configuration of a vehicle headlamp lighting system using a headlamp light source lighting device of an embodiment 2 in accordance with the present invention.

FIG. 3 is a diagram showing a configuration of a vehicle headlamp lighting system using a headlamp light source lighting device of an embodiment 2 in accordance with the present invention. In FIG. 3, the vehicle headlamp lighting system 1 of the embodiment 2 is basically the same as the foregoing embodiment 1 in the configuration, but differs in the configuration of the abnormal event informing signal output circuit of the lighting device 3-1 (3-2). Accordingly, in the configuration shown in FIG. 3, the same or like components to those of FIG. 1 are designated by the same reference numerals and their description will be omitted.

In the lighting device 3-1 (3-2) of the embodiment 2, the switching element 7a-1 (7a-2) of the abnormal event informing signal output circuit consists of a PNP transistor which has its base terminal connected to the informing output terminal of the control circuit 6-1 (6-2) via the resistor R10 (R20), and has its emitter terminal connected to the power supply 5 of the lighting device 1 and its collector terminal form an open collector output for the signal output to the abnormal event informing device 4. The control circuit 6-1, switching element 7a-1 and resistors R10 and R11 constitute the abnormal event informing signal output circuit of the lighting device 3-1, and the control circuit 6-2, switching element 7a-2 and resistors R20 and R21 constitute the abnormal event informing signal output circuit of the lighting device 3-2.

When the switching element 7a-1 is off, since the collector current does not flow through the resistor R11 and a voltage drop does not occur through R1, the signal output of the lighting device 3-1 side is placed at low potential level (L level) corresponding to the ground level. On the other hand, when the switching element 7a-1 is on, a voltage drop through the resistors R1 and R11 occurs, and the signal output of the lighting device 3-1 side is placed at high potential level (H level) (active "H") corresponding to the voltage obtained by dividing the voltage of the power supply 5 by the resistors R1 and R11.

Likewise, when the switching element 7a-2 is off, the signal output of the lighting device 3-2 side is placed at L level. In contrast, when the switching element 7a-2 is on, the signal output of the lighting device 3-2 side is placed at H level (active "H").

The abnormal event informing device 4, which is a device for lighting an alarm lamp 12 in response to a result of comparing the abnormal event informing signal output value from the control circuit 6-1 (6-2) with a predetermined abnormal event informing discrimination voltage value, comprises the filter 10 and a decision circuit 11a. The filter 10 comprises the resistor R connected to the output path of the abnormal event informing signal and the capacitor C having its first end grounded, and generates a smoothed signal of the abnormal event informing signal.

The decision circuit 11a is a comparator for comparing the voltage level of the smoothed signal passing through the filter 10 with the predetermined abnormal event informing discrimination voltage for deciding the presence or absence of an abnormal event, and supplies the alarm lamp 12 with the output signal with a predetermined potential level if making a decision that the abnormal event occurs. Incidentally, since the decision circuit 11a is supplied with the opposite polarity signal to that in the foregoing embodiment 1, the polarity of the output terminal connected to the alarm lamp 12 is inverted. The alarm lamp 12 is a lamp that undergoes lighting control in response to a decision result of the decision circuit 11a. A driver can learn from the lighting of the alarm lamp 12 that an abnormal event occurs in the light source 2-1 (2-2) or lighting device 3-1 (3-2).

As described above, in the same manner as the foregoing embodiment 1, the present embodiment 2 connects in a wired OR fashion the outputs of both the switching elements 7a-1 and 7a-2 having the open collector output so as to be able to combine the output voltages of the abnormal event informing signals from the control circuits 6-1 and 6-2. Thus arranging the abnormal event informing output systems of the right and left lighting devices 3-1 and 3-2 of a vehicle into a single system makes it possible to simplify the configuration of the output system and to reduce the amount of components required for the configuration. In addition, the simple configuration and the reduction in the number of parts can contribute to weight reduction of the vehicle.

Next, the operation will be described.

Figure 4:
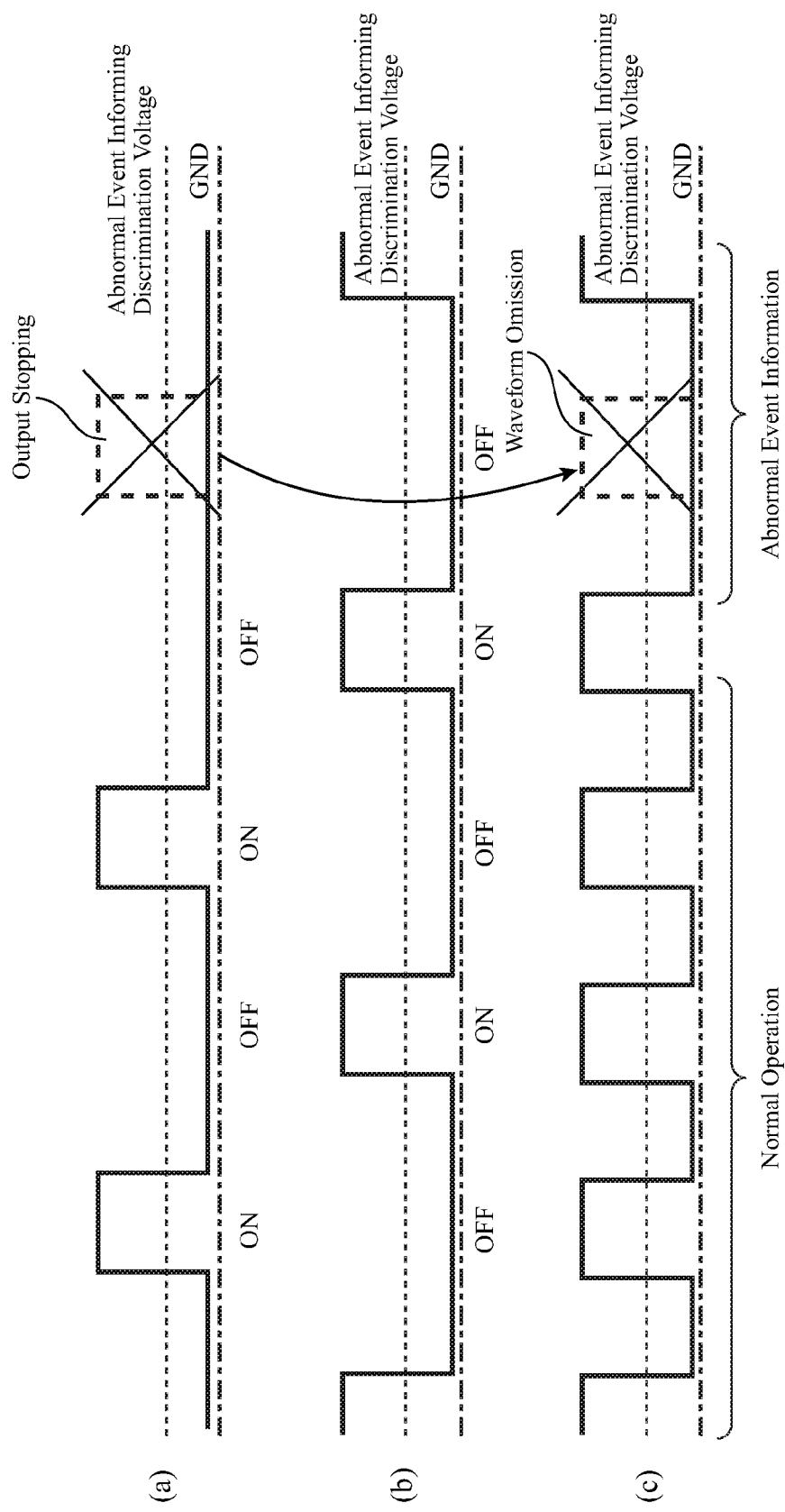
FIG. 4 is a diagram showing output waveforms of an abnormal event informing signal of the lighting device of the embodiment 2.

FIG. 4 is a diagram showing output waveforms of the abnormal event informing signal in the lighting device of the embodiment 2; FIG. 4(a) shows the output waveform of the abnormal event informing signal of the lighting device 3-1; FIG. 4(b) shows the output waveform of the abnormal event informing signal of the lighting device 3-2; and FIG. 4(c) shows a combined output waveform of the abnormal event informing signals of the lighting devices 3-1 and 3-2. In FIG. 4, the output waveforms are the same as those of FIG. 2 described in the foregoing embodiment 1 except that they have opposite polarity.

In the embodiment 2, since the collectors of the switching elements 7a-1 and 7a-2 have the wired OR connection, in the normal operation shown in FIG. 4(c), the signal output waveforms from the control circuits 6-1 and 6-2 are combined to form a single rectangular wave with an approximately uniform period. In this way, if the abnormal event informing signal is a regular rectangular wave signal, the filter 10 for smoothing it to produce a DC voltage level signal to be compared with the abnormal event informing discrimination voltage for making a decision is simplified and can be constructed easily. Accordingly, the input circuit of the abnormal event informing device 4 can be configured easily.

Incidentally, a configuration is also possible in which the control circuits 6-1 and 6-2 adjust the width of the rectangular wave of the informing output in such a manner that the abnormal event informing signal output waveform, which is produced by combining the abnormal event informing signals output from the lighting devices 3-1 and 3-2, has a ratio of 1:1 in width between H level and L level, that is, has a duty ratio of about 50%. In this case, generating signals with a ratio of 1:3 in width between the H level and L level alternately by the lighting devices 3-1 and 3-2 enables the abnormal event informing signal output waveform produced by combining the two waves to form a regular rectangular wave signal with a duty ratio of about 50%. By thus doing, the configuration of the filter 10 can be simplified, and the input circuit of the abnormal event informing device 4 can be constructed more easily.

Here, if an abnormal event occurs in the light source 2-1 or lighting device 3-1, for example, the control circuit 6-1 stops the informing output. Accordingly, as indicated by the X in FIG. 4(a), the abnormal event informing signal output from the lighting device 3-1 stops and the output voltage is placed at L level as indicated by a solid line. Here, as for the abnormal event informing signal output waveform that combines the two waves from the lighting devices 3-1 and 3-2, as indicated by the X in FIG. 4(c), the output waveform of the lighting device 3-1 side has an omission as indicated by a solid line. The decision circuit 11a compares the voltage level of the output of the filter 10 that smoothes the abnormal event informing signal output waveform with the abnormal event informing discrimination voltage to detect the output waveform omission, thereby lighting the alarm lamp 12.

As described above, the present embodiment 2 has an active "H" configuration that employs the PNP transistors as the switching elements of the abnormal event informing signal output circuits, and is able to achieve the same advantage as the foregoing embodiment 1 and to simplify the configuration as in FIG. 1.

Incidentally, although the foregoing embodiment 2 shows the abnormal event informing signal output circuits which employ as the switching elements 7a-1 and 7a-2 the PNP transistors that are arranged in the open collector and connected in the wired OR fashion, the present invention is not limited to the configuration.

For example, as a configuration that outputs a rectangular wave as the informing output and has an active "H" structure for outputting an H level signal in the on state, a configuration is also possible which employs an open drain using a field-effect transistor (FET) for the switching element 7a-1 (7a-2).

In addition, a totem-pole output stage which arranges transistors top and bottom can be used.

Furthermore, it is also possible to construct the abnormal event informing signal output circuit by one of the open collector output, open drain output and totem pole output, and to inform of the abnormal event by a voltage signal instead of the rectangular wave via the resistors R11 and R21 connected in series to the signal output.

Embodiment 3

Figure 5:
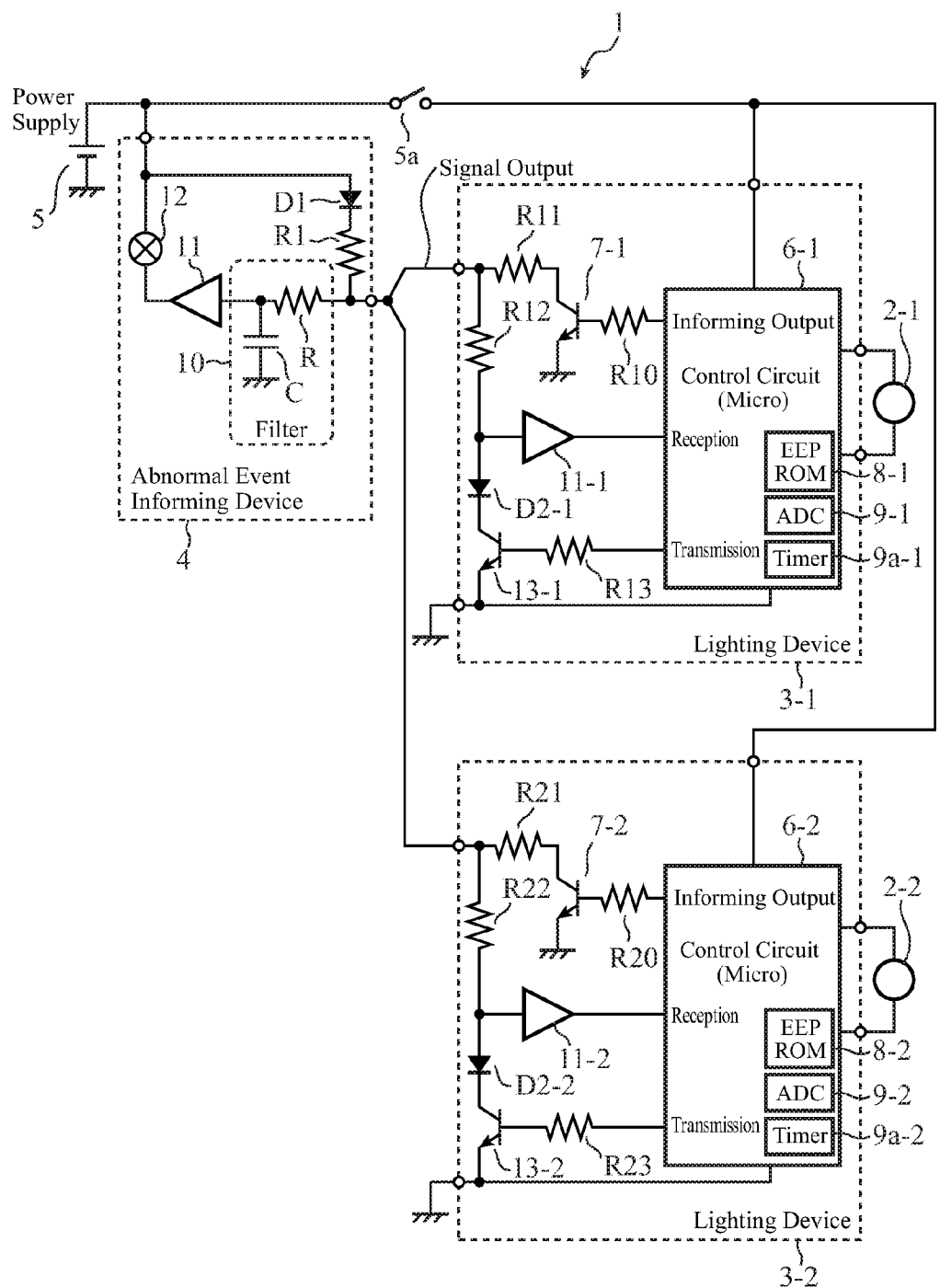
FIG. 5 is a diagram showing a configuration of a vehicle headlamp lighting system using a headlamp light source lighting device of an embodiment 3 in accordance with the present invention.

FIG. 5 is a diagram showing a configuration of a vehicle headlamp lighting system using a headlamp light source lighting device of an embodiment 3 in accordance with the present invention. In FIG. 5, the same or like components to those of FIG. 1 are designated by the same reference numerals and their description will be omitted. The vehicle headlamp lighting system 1 of the embodiment 3 comprises the light sources 2-1 and 2-2, the lighting devices (headlamp light source lighting devices) 3-1 and 3-2, the abnormal event informing device 4, the power supply 5 and the power supply switch (power supply SW) 5a. The lighting device 3-1 (3-2) of the embodiment 3 comprises a decision circuit 11-1 (11-2) and a switching element 13-1 (13-2) in addition to the components shown in FIG. 1.

The switching element 13-1 (13-2) consists of an NPN transistor that has its base terminal connected to a transmission terminal of the communication signal of the control circuit 6-1 (6-2) via a resistor R13 (R23) and its emitter terminal connected to the ground, andhas its collector terminal form an open collector output for the signal output. The control circuit 6-1 (6-2) transmits the communication signal for transferring the information each lighting device 3-1 (3-2) has between them, and the signal output is applied to the base terminal of the switching element 13-1 (13-2). In addition, it receives the communication signal via the decision circuit 11-1 (11-2). The control circuit 6-1, switching element 13-1, diode D2-1, decision circuit 11-1 and resistors R12 and R13 constitute a communication signal input/output circuit of the lighting device 3-1, and the control circuit 6-2, switching element 13-2, diode D2-2, decision circuit 11-2 and resistors R22 and R23 constitute a communication signal input/output circuit of the lighting device 3-2.

When the switching element 13-1 is off, the signal output of the lighting device 3-1 side is placed at a high potential level (H level) corresponding to the ignition (IG) power supply. On the other hand, when the switching element 13-1 is on, the signal output of the lighting device 3-1 side is pulled down to a low potential level (L level) (active "L").

Likewise, when the switching element 13-2 is off, the signal output of the lighting device 3-2 side is placed at H level corresponding to the IG power supply, and when the switching element 13-2 is on, the signal output of the lighting device 3-2 side is placed at L level (active "L").

The decision circuit 11-1, which is connected to the signal output of the lighting device 3-1 side via the resistor R12, is a comparator for receiving the communication signal sent from the lighting device 3-2 by comparing the voltage level of the communication signal from the control circuit 6-2 with a predetermined signal discrimination voltage. It converts the signal the lighting device 3-2 transmits to the output signal with a predetermined potential level and supplies to the receiving terminal of the control circuit 6-1.

Likewise, the decision circuit 11-2, which is connected to the signal output of the lighting device 3-2 side via the resistor R22, receives the communication signal sent from the lighting device 3-1 by comparing the voltage level of the communication signal from the control circuit 6-1 with a predetermined signal discrimination voltage. It converts the signal the lighting device 3-1 transmits to the output signal with a predetermined potential level and supplies to the receiving terminal of the control circuit 6-2.

As described above, the present embodiment 3 connects the switching elements 7-1 and 7-2 to the abnormal event informing device 4 as an open collector output capable of combining the output voltages of the abnormal event informing signals from the control circuits 6-1 and 6-2, and further connects the switching elements 13-1 and 13-2 in a wired OR fashion as an open collector so as to enable the communication signals for communicating the information the lighting devices 3-1 and 3-2 have to be superposed on the foregoing abnormal event informing signal.

In this way, the right and left lighting devices 3-1 and 3-2 can communicate with each other without providing any new wire for communication between the abnormal event informing device 4 and the right and left lighting devices or between the lighting devices. For example, the right and left lighting devices can make a decision as to whether their operation is normal or not with each other by monitoring their communication signals of each other. Accordingly, when a first lighting device has an abnormal event and does not operate, a second lighting device can notify the abnormal event informing device 4 of the occurrence of the abnormal event.

Next, the operation will be described.

Figure 6:
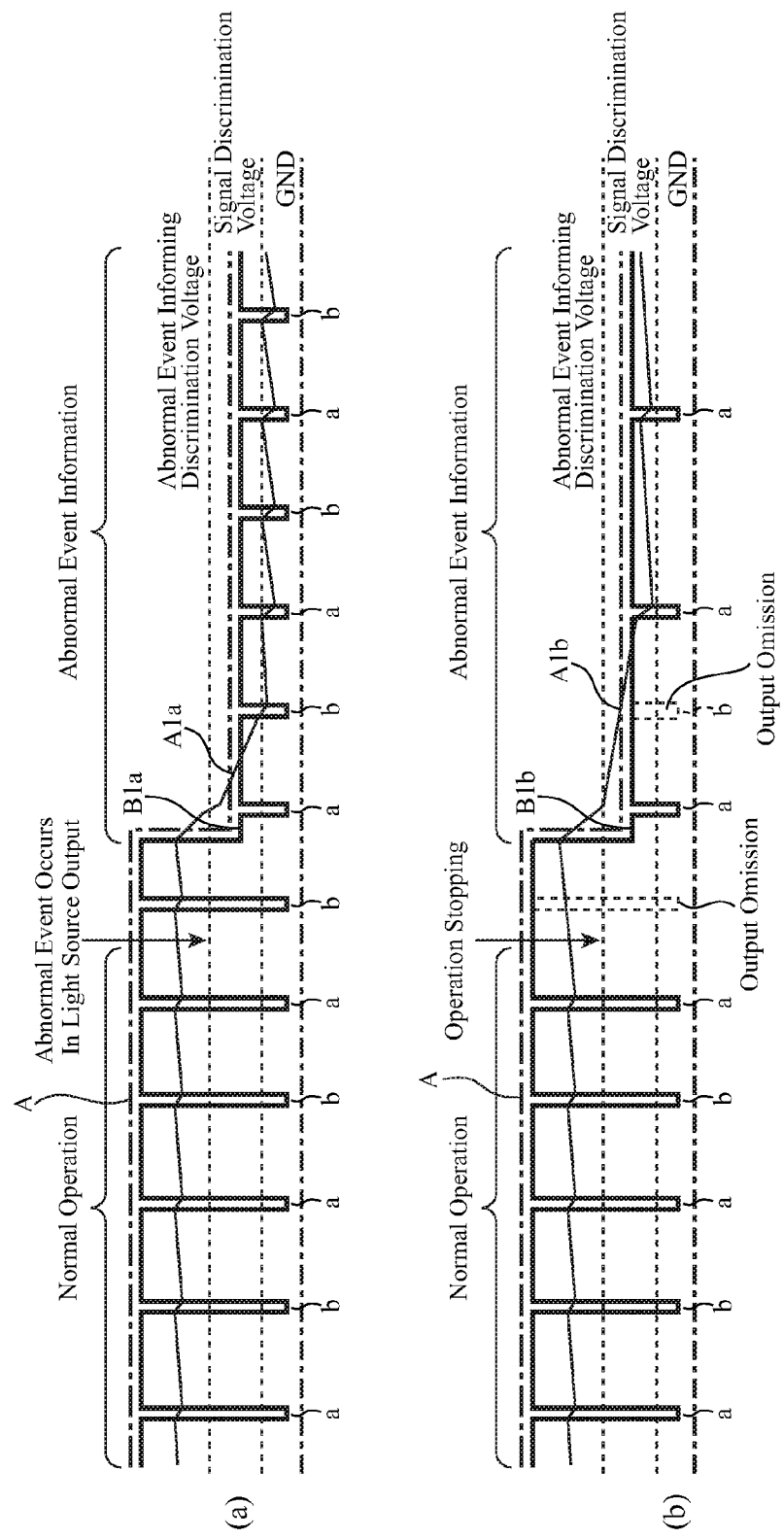
FIG. 6 is a diagram showing combined output waveforms of an abnormal event informing signal and a communication signal by the lighting device of the embodiment 3.

FIG. 6 is a diagram showing combined output waveforms of the abnormal event informing signal and the communication signal in the lighting device of the embodiment 3. FIG. 6(a) shows a combined output waveform when the lighting device 3-1 detects its own abnormal event and informs of the abnormal event; and FIG. 6(b) shows a combined output waveform when the lighting device 3-1 detects an abnormal event of the lighting device 3-2 and informs of the abnormal event.

As long as the control circuit 6-1 (6-2) operates normally, it causes the informing output to be placed at L level potential. When the informing output is L level, the switching element 7-1 (7-2) is off and the output A of the abnormal event informing signal via the open collector of the switching element 7-1 (7-2) is placed at a combinedvoltage as shown in FIG. 6(a) which combines the H level signals of each other.

In this way, in the embodiment 3, the abnormal event informing signal output circuit of the lighting device 3-1 (3-2) outputs a fixed voltage signal as the abnormal event informing signal, and transfers the combined voltage to the abnormal event informing device 4 as the abnormal event informing signal. If an abnormal event occurs, the control circuit that detects the abnormal event alters the voltage of the abnormal event informing signal it outputs. Accordingly, for the onboard equipment side that receives the abnormal event informing signal, it is enough to have a simple circuit for detecting the voltage level change of the abnormal event informing signal.

In addition, the control circuit 6-1 (6-2) transmits the information it possesses as the communication signal. The communication signal is superposed on the abnormal event informing signal through the wired OR connection of the open collector of the switching element 13-1 (13-2) as shown in FIG. 6(a).

In FIG. 6, a signal wave a is the communication output from the control circuit 6-1 and a signal wave b is the communication output from the control circuit 6-2. Incidentally, the control circuit 6-1 (6-2) does not transmit its communication signal at the timing the other side transmits the communication signal so as not to hinder communication of each other. Thus, they can transfer the information to each other by stable communication.

Detecting that an abnormal event occurs in the lighting device 3-1 at the timing Bla shown in FIG. 6(a), for example, the control circuit 6-1 turns on the switching element 7-1 by placing the informing output at H level immediately. This causes the abnormal event informing signal output A of the switching element 7-1 to drop to L level so as to form a combined voltage that adds the L level signal of the lighting device 3-1 side and the H level signal of the lighting device 3-2 side as shown in FIG. 6(a).

After that, the decision circuit 11 compares the voltage level of the output A1a, which is obtained by smoothing the abnormal event informing signal output A through the filter 10, with the abnormal event informing discrimination voltage, and if the voltage level of the output A1a is less than the abnormal event informing discrimination voltage, it decides the occurrence of the abnormal event and lights the alarm lamp 12.

Next, an example will be explained in which an abnormal event occurs in the lighting device 3-2 and the control circuit 6-2 stops transmission of the signal wave b. In this case, even if the decision circuit 11-1 on the lighting device 3-1 side compares the voltage level of the communication signal from the control circuit 6-2 with the predetermined signal discrimination voltage, it cannot detect, at the timing the signal wave b from the control circuit 6-2 is to be detected, the voltage level lower than the signal discrimination voltage. Thus, it detects that the output of the signal wave b from the control circuit 6-2 has an omission (denoted by broken lines in FIG. 6(b)).

Receiving the foregoing signal from the decision circuit 11-1, the control circuit 6-1 decides the abnormal event of the lighting device 3-2 and turns on the switching element 7-1 by immediately placing the informing output at H level potential (indicated by timing Bib in FIG. 6(b)). Thus, the abnormal event informing signal output A of the switching element 7-1 drops to L level so as to form a combined voltage obtained by adding the L level signal of the lighting device 3-1 side and the H level signal of the lighting device 3-2 side as shown in FIG. 6(b).

After that, the decision circuit 11 compares the voltage level of the output A1b, which is obtained by smoothing the abnormal event informing signal output A through the filter 10, with the abnormal event informing discrimination voltage, and if the voltage level of the output A1b is less than the abnormal event informing discrimination voltage, it decides the occurrence of the abnormal event and lights the alarm lamp 12. Thus, the driver can learn which of the light sources 2-1 and 2-2 or which of the lighting devices 3-1 and 3-2 brings about the abnormal event.

Incidentally, the control circuit 6-1 (6-2) can make the voltage amplitude of the communication signal greater than the voltage amplitude of the abnormal event informing signal. By thus doing, it becomes possible to set a threshold of the communication signal (signal discrimination voltage) and a threshold of the abnormal event informing signal (abnormal event informing discrimination voltage) at different values, which makes it possible to discriminate between the abnormal event informing signal and the communication signal according to the voltage level. Thus, it can perform communication of the information while informing of the abnormal event.

In addition, since the collectors of the switching elements 13-1 and 13-2 are connected in the wired OR fashion, in the normal operation shown in FIG. 6, the communication signal output waveforms from the control circuits 6-1 and 6-2 are combined into a single wave with an approximately uniform period. In this way, if the communication signal is a regular rectangular wave signal, the filter 10, which smoothes the signal to produce a DC voltage level signal to be compared with the signal discrimination voltage for making the decision, can be constructed easily. In addition, the signal wave repeated at the approximately uniform period makes it possible to estimate the timing for receiving the communication signal between the lighting devices, thereby being able to receive the communication signal reliably.

As described above, according to the present embodiment 3, the abnormal event informing signal output circuits of the lighting devices 3-1 and 3-2 output the fixed voltage signals as the abnormal event informing signals, respectively, and make the combined voltage of them as the abnormal event informing signal. If an abnormal event occurs, the control circuit that detects the abnormal event alters the voltage of the abnormal event informing signal it outputs. Thus, on the onboard equipment side that receives the abnormal event informing signal, it is enough to prepare a simple circuit for detecting the voltage level change in the abnormal event informing signal, thereby being able to simplify its configuration.

In addition, the control circuit 6-1 (6-2) transmits the signal wave indicating whether an abnormal event occurs in itself or not as the communication signal, and the communication signal is superposed on the abnormal event informing signal via the wired OR connection of the open collector of the switching element 13-1 (13-2). Thus, the right and left lighting devices can make a decision as to whether their operation is normal or not with each other by monitoring their communication signals of each other without providing any new wire for communication between the abnormal event informing device 4 and the right and left lighting devices or between the lighting devices. Accordingly, when a first lighting device has an abnormal event and does not operate, a second lighting device can notify the abnormal event informing device 4 of the occurrence of the abnormal event.

Embodiment 4

Figure 7:
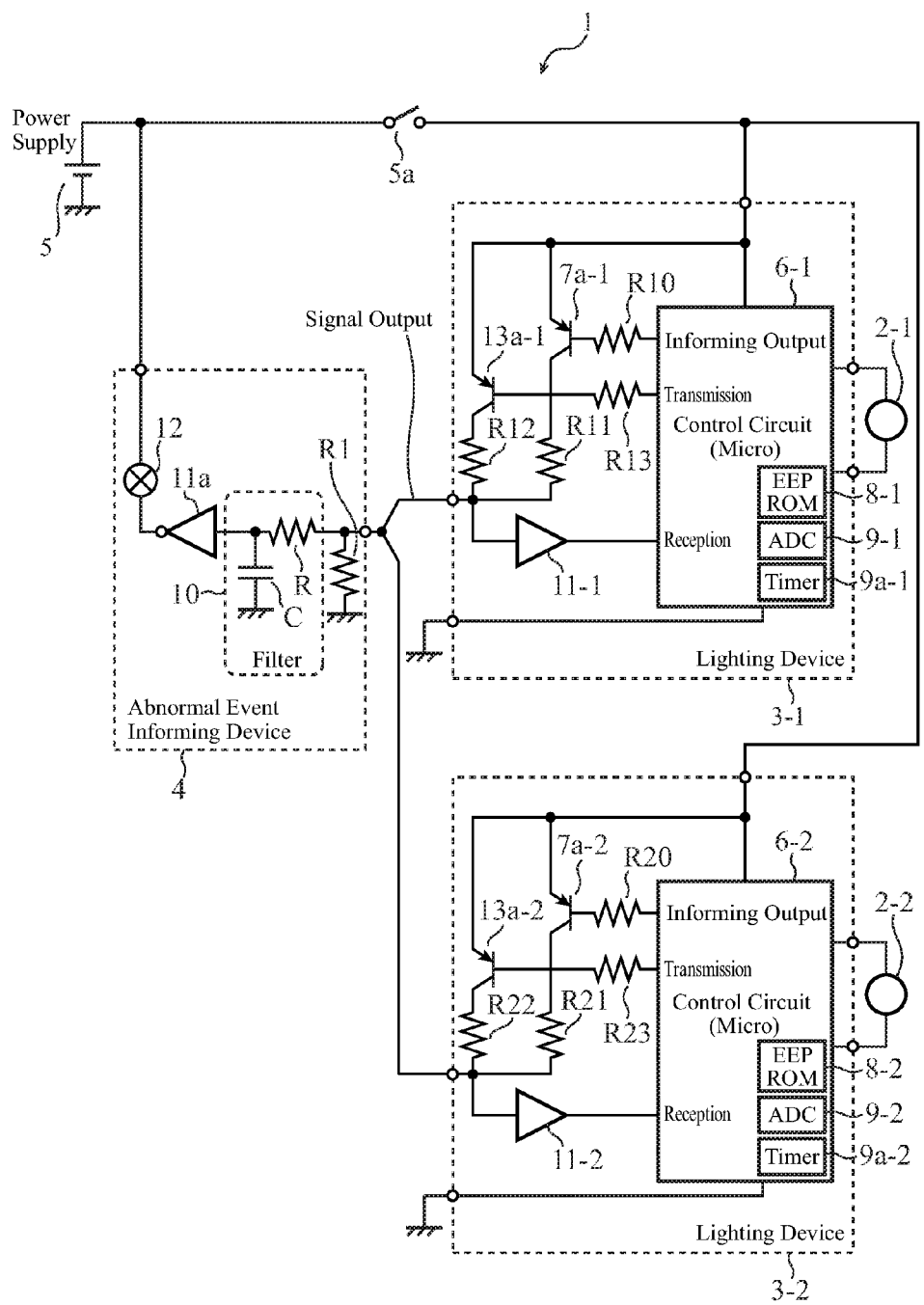
FIG. 7 is a diagram showing a configuration of a vehicle headlamp lighting system using a headlamp light source lighting device of an embodiment 4 in accordance with the present invention.

FIG. 7 is a diagram showing a configuration of a vehicle headlamp lighting system employing a headlamp light source lighting device of an embodiment 4 in accordance with the present invention. In FIG. 7, the same or like components to those of FIG. 3 and FIG. 5 are designated by the same reference numerals and their description will be omitted. Although the vehicle headlamp lighting system 1 of the embodiment 4 is the same as the foregoing embodiment 3 in the basic configuration, it differs in using PNP transistors as the switching elements of the abnormal event informing signal output circuit.

The switching element 13a-1 (13a-2), which consists of a PNP transistor, has its base terminal connected to the transmission terminal of the communication signal of the control circuit 6-1 (6-2) via the resistor R13 (R23) and its emitter terminal connected to the power supply 5 of the lighting device 1, and has its collector terminal form an open collector for a signal output. The control circuit 6-1, switching element 13a-1, decision circuit 11-1 and resistors R12 and R13 constitute the communication signal input/output circuit of the lighting device 3-1, and the control circuit 6-2, switching element 13a-2, decision circuit 11-2 and resistors R22 and R23 constitute the communication signal input/output circuit of the lighting device 3-2.

When the switching element 13a-1 is off, the signal output of the lighting device 3-1 side is pulled down to the low potential level (L level). On the other hand, when the switching element 13a-1 is on, the signal output of the lighting device 3-1 side is placed at a high potential level (H level) corresponding to the power supply 5 (active "H").

Likewise, when the switching element 13a-2 is off, the signal output of the lighting device 3-2 side is placed at L level, and when the switching element 13a-2 is on, the signal output of the lighting device 3-2 side is placed at H level (active "H").

The present embodiment 4 connects the switching elements 7a-1 and 7a-2 to the abnormal event informing device 4 as an open collector output capable of combining the output voltages of the abnormal event informing signals from the control circuits 6-1 and 6-2, and further connects the switching elements 13a-1 and 13a-2 in a wired OR fashion as an open collector so as to enable the communication signals for communicating the information the lighting devices 3-1 and 3-2 have to be superposed on the foregoing abnormal event informing signal.

Next, the operation will be described.

Figure 8:
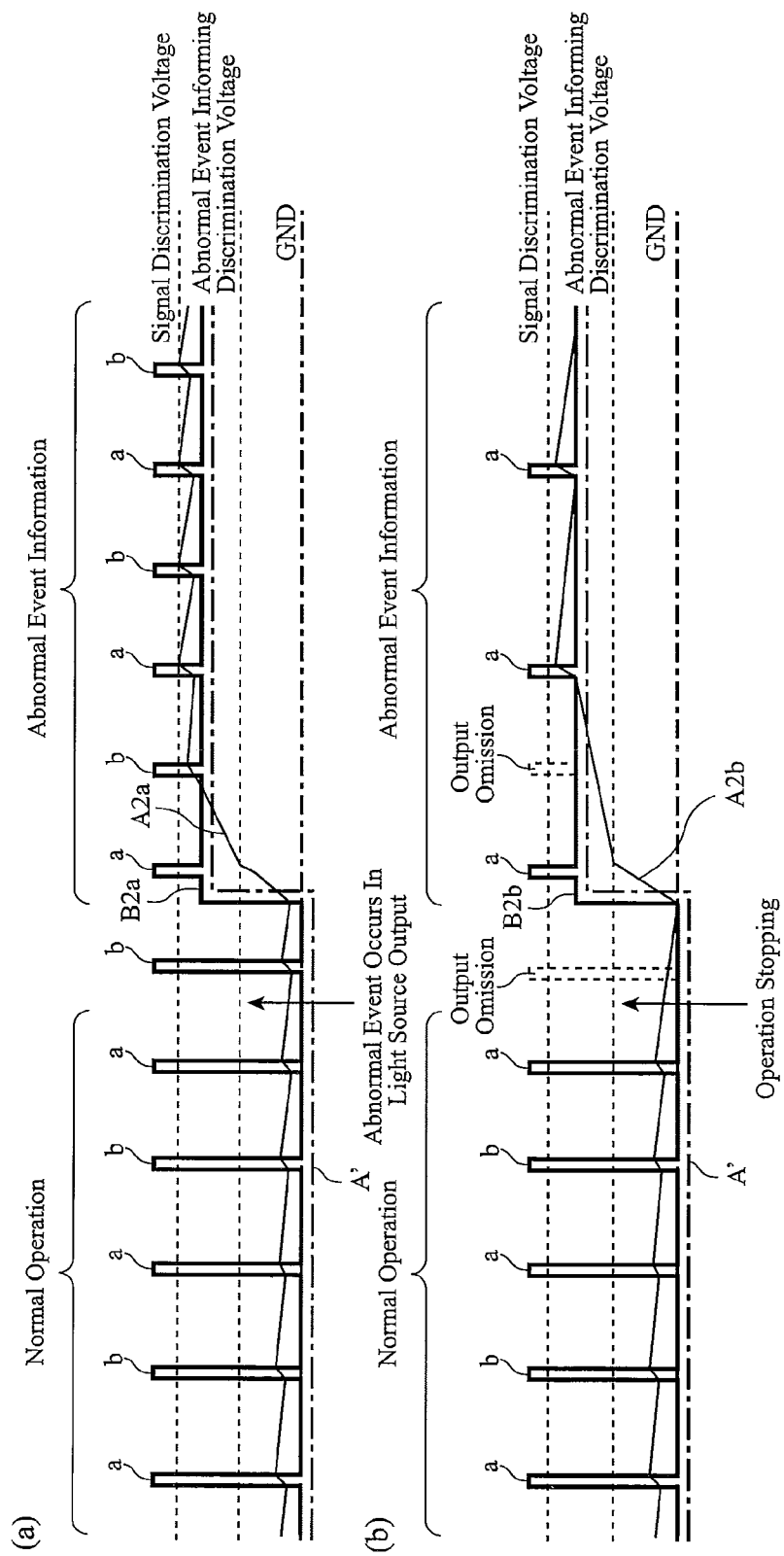
FIG. 8 is a diagram showing combined output waveforms of an abnormal event informing signal and a communication signal by the lighting device of the embodiment 4.

FIG. 8 is a diagram showing combined output waveforms of the abnormal event informing signal and the communication signal in the lighting device of the embodiment 4. FIG. 8(a) shows a combined output waveform when the lighting device 3-1 detects its own abnormal event and informs of the abnormal event; and FIG. 8(b) shows a combined output waveform when the lighting device 3-1 detects an abnormal event of the lighting device 3-2 and informs of the abnormal event.

As long as the control circuit 6-1 (6-2) operates normally, it causes the informing output to be placed at H level potential. When the informing output is H level, the switching element 7a-1 (7a-2) is off and the output A' of the abnormal event informing signal via the open collector of the switching element 7a-1 (7a-2) is placed at a combined voltage as shown in FIG. 8(a) which combines the L level signals of each other.

In addition, the control circuit 6-1 (6-2) transmits the information it possesses as the communication signal in the same manner as in the foregoing embodiment 3. The signal wave is superposed on the abnormal event informing signal through the wired OR connection of the open collector of the switching element 13a-1 (13a-2) as shown in FIG. 8(a).

Incidentally, in FIG. 8, a signal wave a is the communication output from the control circuit 6-1 and a signal wave b is the communication output from the control circuit 6-2. In addition, the control circuit 6-1 (6-2) does not transmit its communication signal at the timing the other side transmits the communication signal so as not to hinder communication of each other. Thus, they can transfer the information to each other by stable communication.

Detecting that an abnormal event occurs in the lighting device 3-1 at the timing B2a shown in FIG. 8(a), for example, the control circuit 6-1 turns on the switching element 7a-1 by placing the informing output at L level immediately. This causes the abnormal event informing signal output A' of the switching element 7a-1 to rise to H level so as to form a combined voltage that adds the H level signal of the lighting device 3-1 side and the L level signal of the lighting device 3-2 side as shown in FIG. 8(a).

After that, the decision circuit 11 compares the voltage level of the output Ata, which is obtained by smoothing the abnormal event informing signal output A' through the filter 10, with the abnormal event informing discrimination voltage, and if the voltage level of the output Ata is not less than the abnormal event informing discrimination voltage, it decides the occurrence of the abnormal event and lights the alarm lamp 12.

Next, an example will be explained in which an abnormal event occurs in the lighting device 3-2 and the control circuit 6-2 stops transmission of the signal wave b. In this case, when the decision circuit 11-1 on the lighting device 3-1 side compares the voltage level of the communication signal from the control circuit 6-2 with the predetermined signal discrimination voltage, the voltage level does not reach the signal discrimination voltage at the timing the signal wave b from the control circuit 6-2 is to be detected. Thus, it detects that the output of the signal wave b from the control circuit 6-2 has an omission (denoted by broken lines in FIG. 8(b)).

Receiving the foregoing signal from the decision circuit 11-1, the control circuit 6-1 decides the abnormal event of the lighting device 3-2 and turns on the switching element 7a-1 by immediately placing the informing output at L level potential (indicated by timing B2b in FIG. 8(b)). Thus, the abnormal event informing signal output A' of the switching element 7a-1 rises to H level so as to form a combined voltage by adding the H level signal of the lighting device 3-1 side and the L level signal of the lighting device 3-2 side as shown in FIG. 8(b).

After that, the decision circuit 11 compares the voltage level of the output A2b, which is obtainedby smoothing the abnormal event informing signal output A' through the filter 10, with the abnormal event informing discrimination voltage, and if the voltage level of the output A2b is not less than the abnormal event informing discrimination voltage, it decides the occurrence of the abnormal event and lights the alarm lamp 12. Thus, the driver can learn which of the light sources 2-1 and 2-2 or which of the lighting devices 3-1 and 3-2 brings about the abnormal event.

As described above, according to the present embodiment 4, it can achieve the same advantages as the foregoing embodiment 3 because it employs the PNP transistor with an active "H" configuration as the switching element of the abnormal event informing signal output circuit. In addition, it can simplify the configuration in the same manner as FIG. 5.

Furthermore, in the foregoing embodiment 3 and embodiment 4, each of the control circuits 6-1 and 6-2 of the lighting devices 3-1 and 3-2 can be configured in such a manner as to output the communication signal after a predetermined delay time has elapsed from the communication output timing of the other control circuit.

For example, when the delay time corresponding to ½ communication period has elapsed after one control circuit outputs the communication signal, the other control circuit outputs the communication signal. In this way, they can output their communication signals at timings shifted by ½ period each, thereby being able to carry out stable communication with a simple configuration without hindering the communication with each other.

Moreover, in the foregoing embodiment 3 and embodiment 4, as for the communication signal the control circuit 6-1 (6-2) outputs, its period can be set sufficiently longer than the time constant of the filter 10 of the abnormal event informing device 4 (configuration on the onboard equipment side), and the duration in which the communication signal is output can be set sufficiently shorter than the time constant of the filter 10.

When deciding the presence or absence of the occurrence of an abnormal event from the voltage value obtained by smoothing the abnormal event informing signal, making the abnormal event informing signal itself close to a DC signal enables the smoothing filter to reduce its size and the circuit configuration to be more effective. Accordingly, the foregoing configuration can simplify the filter 10.

Embodiment 5

In the present embodiment 5, processing will be described which adjusts the output timings of the abnormal event informing signals or communication signals from the control circuits of the right and left lighting devices so that they do not overlap on each other in the configurations of the foregoing embodiment 1 to embodiment 4.

Figure 9:
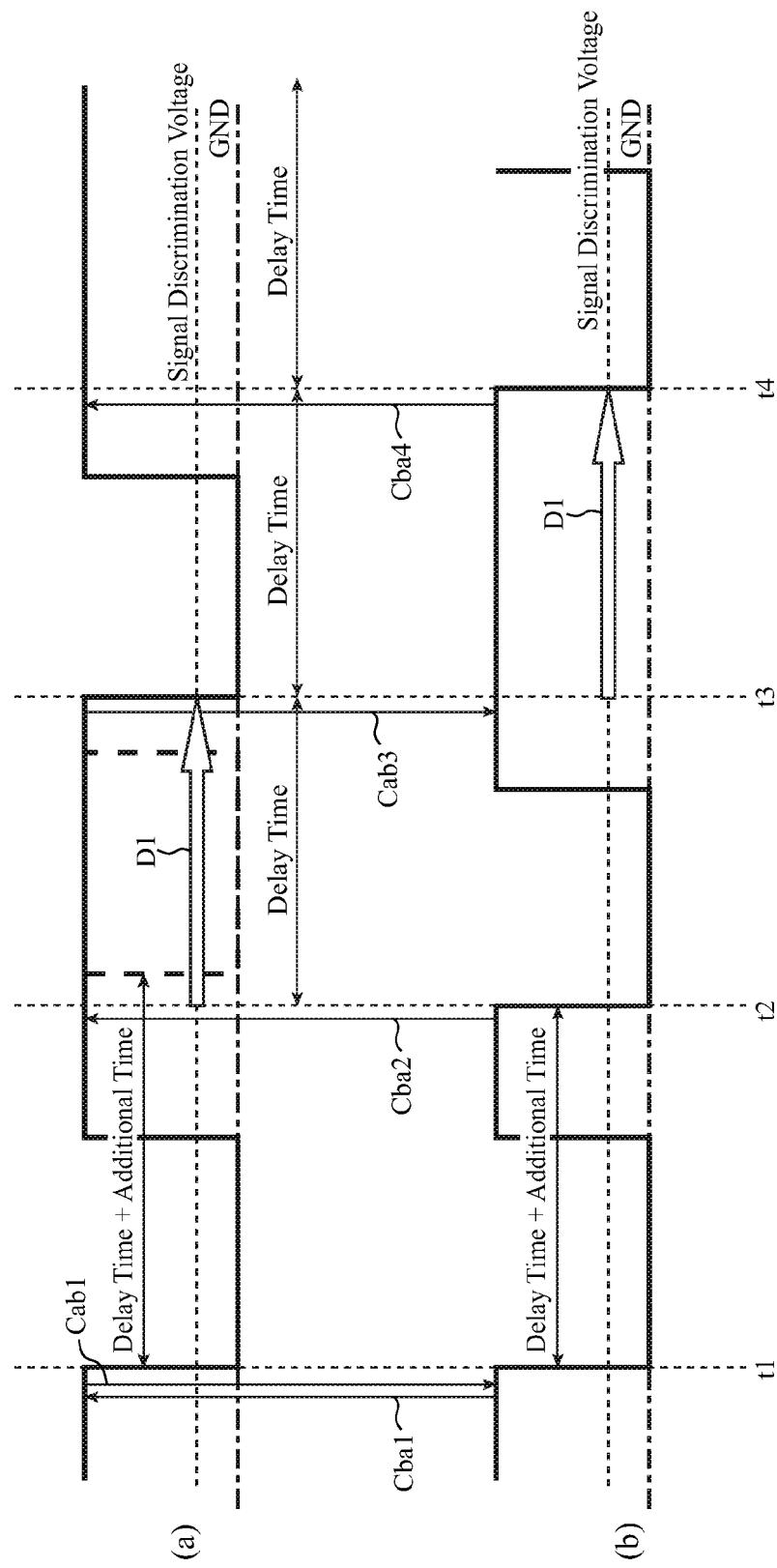
FIG. 9 is a diagram showing an example of adjusting processing of signal output timing of a lighting device of an embodiment 5.

FIG. 9 is a diagram showing an example of the adjusting processing of the signal output timing in the lighting device of the embodiment 5. The example of FIG. 9 schematically shows behavior in which the control circuit 6-1 (6-2) adjusts the output timing of the communication signal in the configuration shown in FIG. 5: FIG. 9(a) shows the signal output of the control circuit 6-1; and FIG. 9(b) shows the signal output of the control circuit 6-2. The processing for adjusting the generation of the signals in FIG. 9 will be described with reference to FIG. 10.

When outputting the abnormal event informing signal or communication signal, the control circuit 6-1 (6-2) of the embodiment 5 checks whether the other control circuit is outputting the signal or not, first. Unless the second control circuit outputs the signal, the first control circuit outputs its signal. If the second control circuit outputs the signal, the first control circuit outputs its signal after a predetermined delay time has elapsed.

Incidentally, as for a method through which the first control circuit checks whether the second control circuit is outputting the signal or not, when the first control circuit monitors and receives the communication signal it transmits by itself, it makes the decision depending on whether the communication signal differs from its own output value because of an interrupt of the communication signal from the second control circuit. In other words, when the signal the first control circuit receives by monitoring the communication signal it transmits differs from the signal it sends out, it can decide that a communication interrupt from the second control circuit occurs.

In the example of FIG. 9, the control circuits 6-1 and 6-2 check the signal level on the communication signal line just before the output of the communication signal. For example, at timing t3, before the lighting device 3-1 outputs the communication signal, the control circuit 6-1 checks by Cab3. If it decides that the lighting device 3-2 does not carry out communication, the control circuit 6-1 performs a normal signal output as indicated by t3 of FIG. 9(a). On the other hand, the control circuit 6-2, receiving the signal output from the lighting device 3-1, sets its own timer at a predetermined delay time D1, and sends out its signal after the predetermined delay time D1 has elapsed as indicated by t4 of FIG. 9(b).

Incidentally, as indicated by timing t1, when the lighting devices 3-1 and 3-2 perform the signal output simultaneously, it is detected as an abnormal event by the monitoring they perform as described above. Accordingly, they carry out their signal output again after the delay time plus additional time has elapsed. After that, if the control circuit 6-2 tries to output the communication signal at t2 before the control circuit 6-1, it checks the signal of the lighting device 3-1 as indicated by Cba2 from the lighting device 3-2 side just before the output. Since it does not detect the signal of the lighting device 3-1 side by checking the signal level as indicated by Cba2, it outputs the signal as indicated by t2 of FIG. 9(b). On the other hand, as indicated by t2 of FIG. 9(a), receiving the signal output from the lighting device 3-2, the control circuit 6-1 resets the previously set delay time plus the additional time to the predetermined delay time D1 and carries out the signal output after the predetermined delay time D1 has elapsed from the timing t2.

Figure 10:
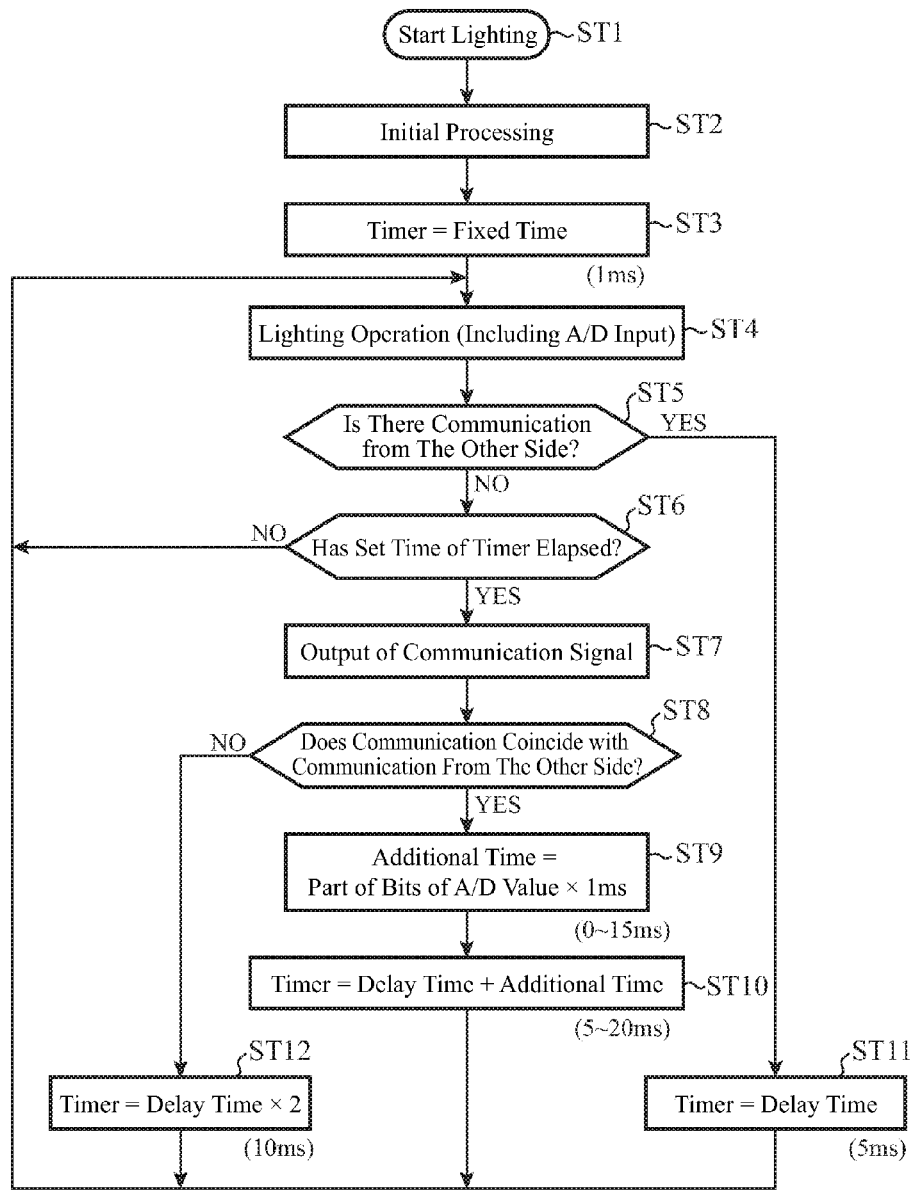
FIG. 10 is a flowchart showing a flow of the adjusting processing of the signal output timing.

FIG. 10 is a flowchart showing a flow of adjusting processing of signal output timing including an initial stage of lighting. Referring to FIG. 10 and FIG. 9, details of the adjusting processing of the signal output timing will be described in terms of the operation of one of the lighting devices.

First, when the lighting of the headlamps starts (step ST1), the lighting device carries out the predetermined initial processing (step ST2).

Incidentally, at the start of lighting, since the power is supplies to the right and left lighting devices at the same time, it is highly possible that the lighting devices 3-1 and 3-2 start the initial processing at the same timing. In this case, as shown in FIG. 9, when the two lighting devices start their operation at the same timing, the output signals are likely to coincide with each other at the initial signal output timing t1.

When the signals output from the right and left lighting devices 3-1 and 3-2 coincide as at timing t1, the control circuits 6-1 and 6-2 delay the next signal output timing. However, if the control circuits 6-1 and 6-2 cause delays with the same duration simultaneously, their signals are likely to coincide at the next timing, again.

Accordingly, the embodiment 5 sets different delay times for the control circuits 6-1 and 6-2 by setting random time instead of the predetermined delay time D1, thereby preventing the control circuits 6-1 and 6-2 from outputting the communication signal at the same timing.

After completing the initial processing at step ST2, the control circuit sets a fixed time (1 ms, for example) in the timer (step ST3). Next, the control circuit executes the lighting operation while continuously feeding back light source conditions and environmental conditions (step ST4). Here, it is highly possible that the A/D converter, which is provided in the control circuit for feeding back the environmental conditions, receives a different value for each lighting device.

For example, as for temperature measurement values of the lighting devices from thermistors and output voltages applied to the light sources 2-1 and 2-2 from DC/DC converters, they are almost always different even for the lighting devices 3-1 and 3-2 placed on the right and left of the same vehicle.

To shift the timing of the two, the embodiment 5 sets in each timer the time obtained by adding to the predetermined delay time a pseudo-random time using the output value of the A/D converter which is very likely to be different in the right and left lighting devices. However, it is also possible to set the delay time at a predetermined time (fixed time) or make the additional time a substantially random time.

The control circuit 6-1 (6-2) acquires the digital value (referred to as A/D value from now on) passing through the A/D conversion of the A/D converter 9-1 (9-2), and controls the lighting operation and the generation period of the signal output by the delay time set in the timer.

Executing the lighting operation and observing the communication signal the other side generates (NO at step ST5), the control circuit waits for the time (delay time) set in the timer (NO at step ST6). When the time (delay time) set in the timer has elapsed (YES at step ST6), the control circuit outputs the communication signal (step ST7).

In addition, when communication from the control circuit on the other side occurs (YES at step ST5) while waiting for the time set in the timer (NO at step ST6), the control circuit sets a predetermined delay time (5 ms, for example) in the timer as shown in FIG. 9 (step ST11), and waits for the time (delay time) set in the timer to elapse (step ST6) while executing the lighting operation.

When completing the output operation of the communication signal (step ST7), the control circuit checks whether its own communication signal coincides with the communication signal from the other control circuit (step ST8). As described before, as for the checking method of the coincidence of the two communication signals, one control circuit compares the communication signal it transmits with the received signal it acquires by monitoring the received signal of the signal it transmits, and when they differ, it decides that the communication signal from the other control circuit coincides.

Unless the communication signal from the other side control circuit coincides with the signal of its own (NO at step ST8), the control circuit sets twice the predetermined delay time (time corresponding to the communication period, 10 ms, for example) to the timer (step ST12), and waits for the time set to the timer (double the delay time) to elapse (step ST6) while executing the lighting operation (step ST4).

In contrast, when the communication signal from the control circuit of the other side coincides with its own signal (YES at step ST8), the control circuit calculates the additional time to be added to the predetermined delay time using the A/D value from the A/D converter (step ST9). Here, it obtains the additional time by multiplying a predetermined bit value of the A/D value by a coefficient representing a predetermined time. For example, the coefficient that assigns a weight of 1 ms per 1 bit to the lower 4 bits of the A/D value is multiplied to calculate the time. In this case, a random time of 0-15 ms can be generated as the additional time.

After calculating the additional time, the control circuit sets the time obtained by adding the additional time to the delay time to the timer (step ST10), and waits for the time (delay time including the additional time) set to the timer to elapse (step ST6) while executing the lighting operation (step ST4). For example, as indicated by the timing t1 of FIG. 9(a), when the control circuit 6-1 decides that its own communication signal coincides with the communication signal from the control circuit 6-2, it starts the next communication (t2) after the time equal to the delay time plus the additional time has elapsed. Thus, the two lighting devices can continuously prevent the control circuit 6-1 (6-2) from outputting the communication signal at the same timing, thereby being able to output it alternately every time the delay time has elapsed.

As described above, according to the present embodiment 5, before the control circuit of the first lighting device performs its informing output or communication signal output, it checks whether or not the control circuit of the second lighting device is carrying out its informing output or communication signal output; and unless the second control circuit carries out its informing output or communication signal output, the first side performs its own informing output or communication signal output, and if the second side carries out its informing output or communication signal output, the first side performs its informing output or communication signal output after the predetermined delay time has elapsed. By doing in this way, it can prevent the signals the control circuits 6-1 and 6-2 output from coinciding with each other, thereby being able to output the abnormal event informing signal and the communication signal reliably.

In addition, according to the present embodiment 5, when the timing of the informing output or communication signal output the control circuit of the first lighting device outputs coincides with the timing of the informing output or communication signal output the control circuit of the second lighting device outputs, it employs as the pseudo-random additional time the time obtained by multiplying the bit value of a part of the digital signal passing through the conversion of its own A/D converter by the coefficient for assigning weight of the time, and carries out its own informing output or communication signal output after the time obtained by adding the additional time to the predetermined delay time has elapsed. By thus doing, it can prevent the signals the control circuits 6-1 and 6-2 output from coinciding more positively, thereby being able to output the abnormal event informing signal and the communication signal reliably.

Incidentally, in the foregoing embodiment 1 to embodiment 5, a configuration is also possible in which the control circuit 6-1 (6-2) supplies a signal equivalent to the abnormal event informing signal to the abnormal event informing device 4 for a predetermined interval just after starting the operation by turning on the power supply.

Unless a fault occurs in practice, it is difficult to confirm whether the abnormal event informing device 4 of the onboard equipment operates normally or not (including that the alarm lamp is lit normally), or whether the signal line between the lighting device 3-1 (3-2) and the onboard equipment is connected rightly or not, or whether the lighting device 3-1 (3-2) itself operates normally or not.

Accordingly, the lighting device supplies the onboard equipment with the signal that simulates the abnormal event information for the predetermined interval just after turning on the power supply as described above. This causes the abnormal event informing device 4 to inform of the abnormal event (lighting of the alarm lamp 12) for the foregoing predetermined interval. The operation makes it possible to easily check that the signal line is connected rightly and the abnormal event informing device operates normally.

In addition, in the foregoing embodiment 1 to embodiment 5, a configuration is also possible in which when the control circuit 6-1 (6-2) detects an abnormal event of the light source 2-1 (2-2) or lighting device 3-1 (3-2), it retains the information representing the occurrence of the abnormal event in the EEPROM 8-1 (8-2), and when the power supply is turned off, followed by the next and later lighting manipulation, it can read the foregoing information from the EEPROM 8-1 (8-2) and supplies the abnormal event informing signal to the abnormal event informing device 4 before performing lighting operation. By thus doing, when the light source 2-1 (2-2) or lighting device 3-1 (3-2) has a fault, it is possible to maintain the switch-off state without carrying out the lighting operation in spite of the lighting manipulation, and to continue informing the abnormal event via the abnormal event informing device 4.

Industrial Applicability

A headlamp light source lighting device in accordance with the present invention can inform the onboard equipment of an abnormal event occurring in the headlamp light source with a simple configuration. Accordingly, it is suitable for the headlamp light source lighting device of a car.

What is claimed is:

1. A headlamp light source lighting device which performs lighting control of a light source and has a controller that detects an abnormal event occurring at least in the light source and supplies onboard equipment with an informing output indicating occurrence of the abnormal event, and which is disposed on right and left of a vehicle, wherein
the headlamp light source lighting device comprises an abnormal event informing signal output circuit;
the abnormal event informing signal output circuit supplies the onboard equipment with the informing output via a signal path common to the abnormal event informing signal output circuit of the other headlamp light source lighting device, and
the controller comprises a nonvolatile storage that stores information representing the occurrence of the abnormal event.

2. The headlamp light source lighting device according to claim 1, wherein the abnormal event informing signal output circuit supplies the onboard equipment with a signal equivalent to the signal for informing the onboard equipment of the abnormal event for a predetermined interval just after turning on a power supply.

3. The headlamp light source lighting device according to claim 1, wherein
the abnormal event informing signal output circuit outputs an abnormal event informing signal via an open collector output or open drain circuit.

4. The headlamp light source lighting device according to claim 1, wherein the light source consists of a discharge lamp or semiconductor light source.

5. A headlamp light source lighting device which performs lighting control of a light source and has a controller that detects an abnormal event occurring at least in the light source and supplies onboard equipment with an informing output indicating occurrence of the abnormal event, and which is disposed on right and left of a vehicle, wherein
the headlamp light source lighting device comprises an abnormal event informing signal output circuit;
the abnormal event informing signal output circuit supplies the onboard equipment with the informing output via a signal path common to the abnormal event informing signal output circuit of the other headlamp light source lighting device; and
wherein the abnormal event informing signal output circuit:
outputs a rectangular wave signal; and
outputs the rectangular wave signal at timing different from output timing of an abnormal event informing signal which the abnormal event informing signal output circuit of the other headlamp light source lighting device sends out.

6. The headlamp light source lighting device according to claim 5, wherein the controller:
checks, before the informing output, whether the controller of the other headlamp light source lighting device performs the informing output;
carries out its own informing output unless the controller of the other headlamp light source lighting device performs the informing output; and
carries out its own informing output after a predetermined delay time has elapsed if the controller of the other headlamp light source lighting device performs the informing output.

7. The headlamp light source lighting device according to claim 5, wherein the controller comprises:
an A/D converter that performs analog-to-digital conversion of data to be used for the lighting control of the light source, and wherein
when timing of the informing output of the controller coincides with timing of the informing output of the controller of the other headlamp light source lighting device, the controller alters informing signal generating timing by using a time the controller calculates by multiplying a digital signal value passing through conversion of its own A/D converter by a coefficient for assigning a weight to the time.

8. The headlamp light source lighting device according to claim 5, wherein the abnormal event informing signal output circuit outputs the rectangular wave signal that will cause a waveform of an abnormal event informing signal to have a ratio of about 1:1 between a high level and a low level of the waveform, the abnormal event informing signal being formed by combining via the signal path the rectangular wave signal with a rectangular wave signal the other headlamp light source lighting device outputs.

9. The headlamp light source lighting device according to claim 5, wherein the abnormal event informing signal output circuit outputs the rectangular wave signal at timing that will cause the waveform of the abnormal event informing signal to become a rectangular wave with approximately uniform signal intervals as a result by combining the rectangular wave signal with the signal the other headlamp light source lighting device sends out.

10. A headlamp light source lighting device which performs lighting control of a light source and has a controller that detects an abnormal event occurring at least in the light source and supplies onboard equipment with an informing output indicating occurrence of the abnormal event, and which is disposed on right and left of a vehicle, wherein
the headlamp light source lighting device comprises an abnormal event informing signal output circuit;
the abnormal event informing signal output circuit supplies the onboard equipment with the informing output via a signal path common to the abnormal event informing signal output circuit of the other headlamp light source lighting device; and
wherein the abnormal event informing signal output circuit outputs a voltage signal to be combined with a voltage signal output from the abnormal event informing signal output circuit of the other headlamp light source lighting device, and supplies the voltage signal to the onboard equipment as an abnormal event informing signal.

11. The headlamp light source lighting device according to claim 10, wherein the abnormal event informing signal output circuit comprises a communication circuit that superposes a communication signal with the other headlamp light source lighting device upon the abnormal event informing signal.

12. The headlamp light source lighting device according to claim 11, wherein the controller of the headlamp light source lighting device outputs the communication signal at timing different from timing the other headlamp light source lighting device transmits its communication signal.

13. The headlamp light source lighting device according to claim 12, wherein the controller outputs the communication signal after a predetermined delay time has elapsed from timing the other headlamp light source lighting device outputs the communication signal.

14. The headlamp light source lighting device according to claim 12, wherein the controller:
checks, before the communication signal output, whether the controller of the other headlamp light source lighting device performs the communication signal output;

carries out its own communication signal output unless the controller of the other headlamp light source lighting device performs the communication signal output; and carries out its own communication signal output after a predetermined delay time has elapsed if the controller of the other headlamp light source lighting device performs the communication signal output.

15. The headlamp light source lighting device according to claim 12, wherein the controller comprises:

an A/D converter that performs analog-to-digital conversion of data to be used for the lighting control of the light source, and wherein when timing of the communication signal output of the controller coincides with timing of the communication signal output of the controller of the other headlamp light source lighting device, the controller alters communication signal generating timing by using a time the controller calculates by multiplying a digital signal value passing through conversion of its own A/D converter by a coefficient for assigning a weight to the time.

16. The headlamp light source lighting device according to claim 11, wherein the controller:

decides whether an abnormal event occurs in a part relating to the other headlamp light source lighting device from the communication signal the other headlamp light source lighting device sends out; and supplies the abnormal event informing signal to the onboard equipment when making a decision that the abnormal event occurs in the part relating to the other headlamp light source lighting device.

17. The headlamp light source lighting device according to claim 11, wherein the communication circuit uses the communication signal with voltage amplitude greater than voltage amplitude of the abnormal event informing signal.

18. The headlamp light source lighting device according to claim 12, wherein the controller outputs the communication signal at timing that will cause a combined waveform of the communication signal with the communication signal the other headlamp light source lighting device transmits to form a rectangular wave with approximately uniform pulse intervals.

19. A vehicle headlamp lighting system comprising:

the headlamp light source lighting devices as defined in claim 10 provided at right and left of a vehicle; and an abnormal event informing device which is mounted in onboard equipment, and gives abnormal event information by receiving an abnormal event informing signal of the headlamp light source lighting devices.

* * * * *